July 3, 1923.
P. J. ELLEDGE
DIRIGIBLE HEADLIGHT
Filed Feb. 27, 1922
1,460,540
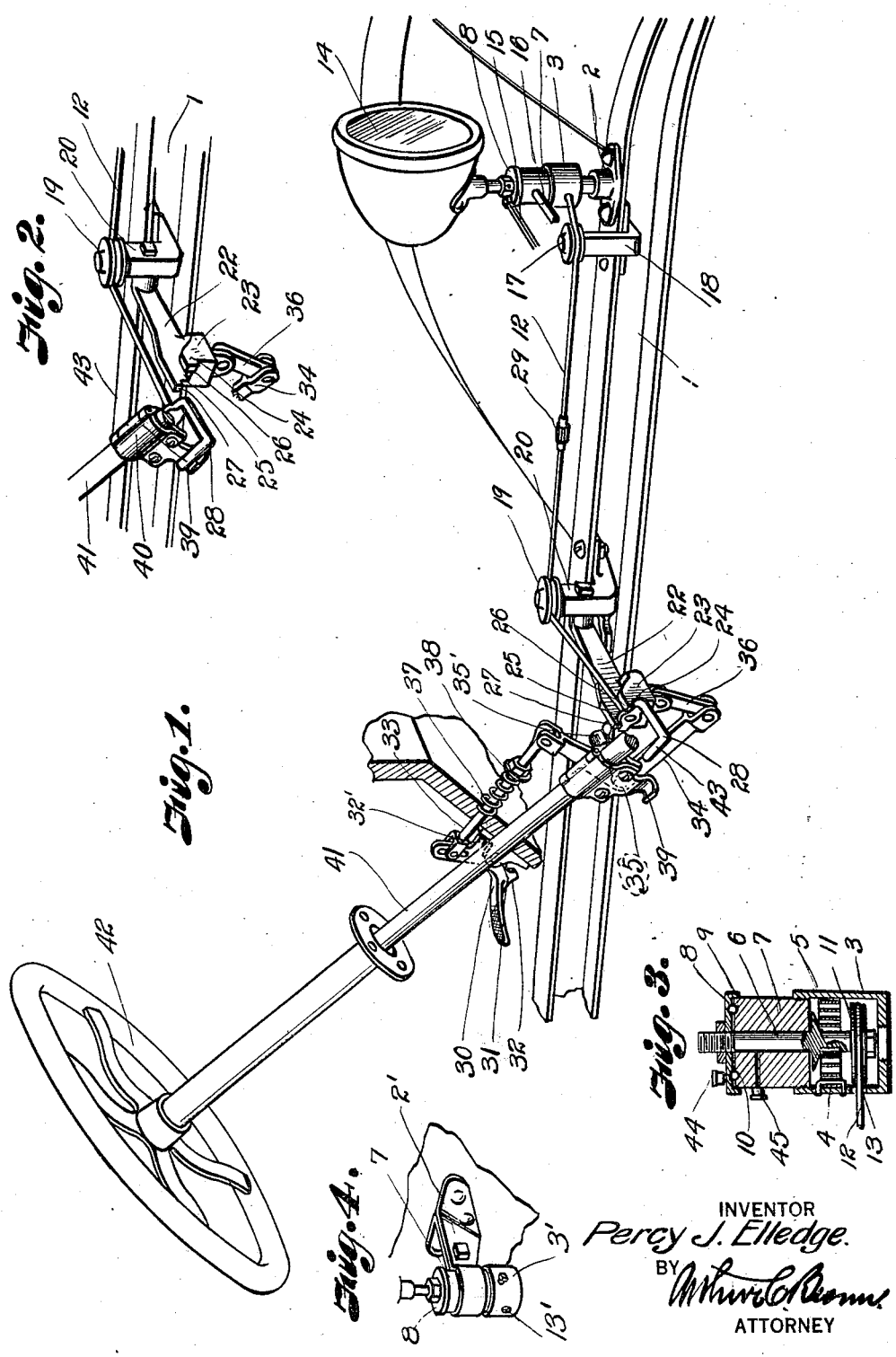
INVENTOR
*Percy J. Elledge.*
BY
ATTORNEY Patented July 3, 1923.

1,460,540

UNITED STATES PATENT OFFICE.

PERCY J. ELLEDGE, OF CLEVELAND, MISSOURI.

DIRIGIBLE HEADLIGHT.

Application filed February 27, 1922. Serial No. 539,454.

*To all whom it may concern:*

Be it known that I, PERCY J. ELLEDGE, a citizen of the United States, residing at Cleveland, in the county of Cass and State of Missouri, have invented certain new and useful Improvements in Dirigible Headlights; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dirigible headlights for motor vehicles and particularly to means whereby the headlights may be controlled from the steering mechanism of the motor vehicle.

The construction is such that when the steering gear is operated to turn the front wheels of the motor vehicle out of a straight path, the lamps will be swung in substantially the same arc as the wheels so that the beams of light will be thrown at angles to the motor vehicle or, in other words, the beams of light will be in the direction that the vehicle is to be turned.

An important feature of my invention is the provision of means whereby the steering gear can be disconnected from the lamp operating means. For example, during the daytime it will not be necessary to operate the lamp operating mechanism, so it may be disconnected temporarily, but when the lamps are on, as for example, in night driving, the lamp operating mechanism can be operatively connected to the steering gear by the driver without leaving his seat.

The peculiarly novel construction of the invention will be described hereinafter, reference being had to the accompanying drawings, in which—

Fig. 1 is a perspective view of the steering post of a motor vehicle and the lamp operating mechanism, one lamp only being shown, the steering post being detached from the lamp operating mechanism.

Fig. 2 is a perspective view of part of the steering mechanism and part of the steering post, showing the lamp operating mechanism operatively connected thereto.

Fig. 3 is a vertical, longitudinal, sectional view through one of the lamp supports, showing the retractive spring for bringing the lamp back to its normal position, and Fig. 4 is a slightly modified form of attaching bracket or support for the lamp whereby the lamp may be secured to the fender.

One side channel bar 1 of the motor vehicle chassis is shown and it carries a pedestal 2, on which is a motor case 3, to the inner wall of which is fastened one end 4 of a motor consisting of a coiled spring 5, the other end of the coil spring being fastened to a spindle 6, rotatably mounted within a block 7 threaded to the case 3 and having at its upper end a disk 8, resting upon anti-friction balls 9 in the raceway 10 of the block 7.

The spindle 6 projects below the spring 4 and carries a grooved pulley 11, around which is a cable or flexible connection 12, one end of the connection 12 being fastened to the pulley 11 and said connection passes through an opening 13 in the case 3. The spindle 6 carries the lamp 14.

To the other side of the chassis, that is, to the opposite rail corresponding to 1, is a like lamp operating mechanism except that the pulley 11 is omitted and the second lamp receives its motion from a connecting rod 15, which can be adjustably secured to a corresponding disk 8 so that when the spindle 6 rotates, a corresponding spindle on the other side of the motor vehicle will rotate in unison therewith, this being possible because the connecting rod 15 is eccentrically secured to the disk 8 and its complementary disk on the other side of the car. This will be readily understood and needs no illustration.

If the spring 5 is strong enough, the case on the other side of the car need not be provided with a spring but it is obvious that a spring can be placed in the housing on the other side of the car if desired.

In order to provide rigidity between the parts, I connect the block 7, which is rigid with the case 3, to a corresponding block on the other side of the bar through the medium of a brace rod 16. The flexible connection 12 passes around an idler 17 on the bracket arm 18, carried by the side bar 1 and around another idler 19 on the bracket arm 20 in rear of the bracket arm 18 and also carried by the side bar 1. The bracket 20 supports a pivoted lever 22 having a head 23 provided with clutch jaws or notches 24 and 25, the upper portions of the jaws having overlapping fingers 26 and 27. The jaws receive an open link 28, which is connected to one end of the cable 12 and intermediate the ends of the cable 12 I may provide a slack take-up in the form of a turnbuckle 29. The link 28 will normally be received in the jaws so that the lamp operating mechanism is held in non-functional position.

The head and jaws, however, constitute a link shifter which can be operated from a lever 30, pivoted at 31 to the dash or foot board of the car. The lower portion of the lever is provided with a stop projection 32, which will limit the movement of the lever in one direction, as will be explained hereinafter.

The upper end of the lever is connected to a link rod 33 which, in turn, is pivoted to an elbow lever 34 pivoted to a suitable support at 35 and having one end connected to the head 23 by a link 36. Therefore, when the lever 30 is operated, the lever 22 will be operated and the head can be shifted so as to move the link in a vertical position. The link is normally held in its lowered position because a spring 37 surrounds the link 33 and has one end bearing against a collar 38 and the other end against the dash. Since the spring 37 is an expansion spring, its normal tendency will be to exert a down pull on the link 28 to pull the head down so that the link will be out of operative engagement with the engaging hook 39 on the clamp 40, which may be conveniently attached to the steering post 41, operated by the hand wheel 42 in the usual way.

When the parts are in the position shown in Fig. 1, the steering post can be turned to steer the vehicle without effecting the lamp operating mechanism. This is for daytime driving. Suppose it is desired to operate the lamps, however, the driver pushes down on the lower end of the lever 30, pulling on the link 33 against the expansion spring 37 to rock the elbow lever 34. The link 36 will be pushed up carrying the head on the end of the lever 22 upwardly and since it supports the open link 28, it will be brought in line with the hook 39 which will then be between the end bars of the link. The operator then turns the handle 42 slightly until the hook 39 engages the end bar 43 of the link 28, whereupon, the driver releases the pressure on the lever 30 to allow the head to drop out of line with the link and finger or hook 39. Then the lamp operating mechanism is connected up to the steering gear. Every time the steering post 41 is turned, movement will be imparted to the spindle 6 through the medium of the flexible connection. The motor or spring 5 will turn the lamps in one direction and the lamps will be turned in the opposite direction by the steering post, but all the while the open link 28 will be engaged with the hook portion of the finger 39.

When it is desired to disconnect the open link 28 from engagement with the finger 39, the operator will press upon the lower end of the lever 30 to raise the head or shifter 23 so that its jaws will be in line with the end bar which is parallel to 43 and by manipulating the post 41, the inner end bar, to which the flexible connection 12 is fastenened, will be deposited in the jaws or notches. Then by relieving pressure on the lower end of the lever 30, the spring 37 will be effective in causing the lever 22 to be lowered, carrying the link 28 below the finger or hook 39 so that there can be no engagement when the steering mechanism is operated. The overlying fingers 26 and 27 will prevent the tension on the flexible connection from pulling the link out of position and in actual practice I have found that the transferring of the link to the shifter and from the shifter to the hook 39 can be quickly and conveniently accomplished.

I have shown the lever 30 as a foot pedal so that the operator can manipulate it with his foot although this lever may take other forms if desired. Attention is called to the fact, however, that the lower end of the lever 30 is provided with a stop projection 32 which will limit the downward movement of the lever so that the link 28 will always assume the same position when the lever is pressed down. Therefore, it will always be in position to be engaged by the hook or finger 39 when the transfer is to be made.

When the parts are assembled with the hook 39 in engagement with the bar 43 of the link and it is desired to disengage the hook 39 from the link so that the lamps will not operate, the front wheels will be turned in a straight line. Then the operator presses down on the lever 30, turns the steering wheel to the right or clockwise, then removes the foot from lever 30, which raises the foot pedal rocking lever 35, lowering the head piece 23; the steering wheel is then turned to the left or contra-clockwise, the foot pressed on the lever 30 and held there to maintain the link in line for engagement with the hook, and the steering wheel is turned slightly clockwise. The foot is then removed from the lever to effect engagement of the link by the hook 39.

In Fig. 2 I have shown the link as connected to the finger ready to be operated and it will be apparent that a complementary lamp can be connected to the lamp 14 so that both lamps on opposite sides of the car can be moved in unison. The operating rod 15 for the two lamps, however, can be of any construction and any form of adjustment can be made so that the proper operative connection may be had.

In Fig. 4 I have shown a slightly modified form of means for securing the lamp to the vehicle. The bracket 2' is a strip bent around the block 7 and having laterally projecting ends, which may be fastened to the fender in any well known manner. This bracket is adapted to support the lamp from the fender instead of from the side bar 1 of the chassis.

When the bracket 2' is employed, the cap 3 is removed and a cap 3' is substituted. The cap 3' has its end closed so as to provide a cover to prevent dust and dirt from entering the motor casing.

In the preferred form the cap 3 is provided with a central opening to receive the spindle on the base 2. When the bracket 2' is used, however, this will not be necessary.

The cap 3' is provided with an opening 13', through which the cable 12 may pass. The opening 13' corresponds to the opening 13 in the preferred form shown in Fig. 3.

The pedal lever 30 is provided with a return stop 32', which alternates with the stop 32 in contacting with the foot board or dash of the vehicle so that when pressure is taken off the end 31 and the spring 37 expands, the swinging movement of the lever 30 will be limited so that the lever 22 will hold the link 28 in proper position.

In this respect attention is called to the fact that the fingers 26 and 27 of the link securing jaw are at angles one to the other so that the link will be held at the proper angle to be engaged by the finger 39 when it is raised into position by the lever mechanism.

By reference to Fig. 1 it will be observed that the elbow lever 34 is pivoted at 35 to the lug or projection 35', the lug being supported by the side bar of the vehicle 1. If desired, oil or grease cups 44 and 45 may be provided to lubricate the movable parts.

While the invention is not shown covered, it is obvious that the cable 12 may be enclosed by the hood of the vehicle if desired, so as to protect it from the elements, although I have not deemed it necessary to show the hood in the drawings.

From the foregoing it will be apparent that the dirigible headlight mechanism can be conveniently connected and disconnected from the steering gear of a motor vehicle so that it can be thrown out of operation in the daytime or whenever desirable but be connected up whenever expedient by the driver without the necessity of the driver leaving his seat.

What I claim and desire to secure by Letters-Patent is:

1. In combination with a motor vehicle, a dirigible headlight mechanism comprising a headlight turning spindle, a motor for operating it in one direction, a flexible cable for operating it in another direction, a shiftable link member on one end of the flexible cable, a shifter for said link member, and a member-engaging hook on the steering gear of the motor vehicle adapted to engage the member when it is in one position and to disengage therefrom when it is in another position.

2. In combination with a motor vehicle having a steering post, a finger secured to said post, a spring-retracted, rotatable, lamp-carrying spindle carried by the motor vehicle, a flexible connection secured thereto and adapted to rotate the spindle in one direction, a link on one end of the flexible connection, and means for moving the link into and out of engaging position with respect to the finger.

3. In combination with a motor vehicle having a steering post, a rotatable lamp-carrying spindle supported by the vehicle, a flexible connection secured thereto for operating the spindle in one direction, a spring for retracting the spindle in the opposite direction, a link on one end of the flexible connection, a finger carried by the steering post for engagement with the link, a shifter normally supporting the link, and means for moving the shifter so that the link will be brought into finger-engaging position, the finger being effective in removing the link from engagement with the shifter.

4. In combination with a motor vehicle having a steering post, a rotatable lamp-carrying spindle supported by the vehicle, a flexible connection secured thereto for operating the spindle in one direction, a spring for retracting the spindle in the opposite direction, a link on one end of the flexible connection, a finger carried by the steering post for engagement with the link, a shifter normally supporting the link, and means for moving the shifter so that the link will be brought into finger-engaging position, the finger being effective in removing the link from engagement with the shifter when swung in one direction and repositioning the link with respect to the shifter when it is swung in an opposite direction.

5. The combination with a motor vehicle having a steering post, a lamp turning spindle carried by the motor vehicle, a flexible connection secured to said spindle and adapted to rotate it in one direction, an open link on the end of the flexible connection, a swinging lever adjacent to said link, a head carried by the lever and having notches for engaging the link to normally hold it in inoperative position, a lever accessible from the seat of the motor vehicle for shifting said lever and head, and a finger on the steering post for engaging the link when the shifter lever is moved in one direction, the shifter being capable of moving the link out of engagement with the finger when it moves in an opposite direction.

6. The combination with a motor vehicle having a steering post, a hook-shaped finger thereon adapted to swing when the steering post is rocked, a shifter on the motor vehicle, a foot pedal-operated mechanism for controlling the shifter to impart vertical movement thereto, a removable link carried by the shifter to be engaged and disengaged by the hook-shaped finger, a flexible connection secured to the link, a lamp spindle to which the flexible connection is secured, and a spring for urging the spindle in one rotative direction, the finger being effective through the link and flexible connection for moving the spindle in an opposite rotative direction.

In testimony whereof I affix my signature.

PERCY J. ELLEDGE.